(12) United States Patent
Breuer et al.

(10) Patent No.: US 10,750,085 B2
(45) Date of Patent: Aug. 18, 2020

(54) CAMERA DEVICE FOR CAPTURING A SURROUNDING AREA OF A DRIVER'S OWN VEHICLE AND METHOD FOR PROVIDING A DRIVER ASSISTANCE FUNCTION

(71) Applicant: Conti Temic microelectronic GmbH, Nuremberg (DE)

(72) Inventors: Karsten Breuer, Oberreute (DE); Boris Werthessen, Weissensberg (DE); Konrad Rothenhaeusler, Achberg (DE); Dieter Kroekel, Eriskirch (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 16/319,607

(22) PCT Filed: Jul. 4, 2017

(86) PCT No.: PCT/DE2017/200061
§ 371 (c)(1),
(2) Date: Jan. 22, 2019

(87) PCT Pub. No.: WO2018/014917
PCT Pub. Date: Jan. 25, 2018

(65) Prior Publication Data
US 2020/0059598 A1    Feb. 20, 2020

(30) Foreign Application Priority Data
Jul. 22, 2016   (DE) .................. 10 2016 213 493

(51) Int. Cl.
*H04N 5/232*    (2006.01)
*H04N 7/18*    (2006.01)
(Continued)

(52) U.S. Cl.
CPC ..... *H04N 5/23232* (2013.01); *H04N 5/23238* (2013.01)

(58) Field of Classification Search
CPC ........... H04N 5/23232; H04N 5/23238; H04N 5/3456; H04N 5/347; B60R 1/007;
(Continued)

(56) References Cited

U.S. PATENT DOCUMENTS 10,002,561 B1 *   6/2018   Tridico .................... G09G 3/32
2003/0048202 A1   3/2003   Francois
(Continued)

FOREIGN PATENT DOCUMENTS

DE    102004061998    7/2006
DE    102006024187    11/2006
(Continued)

OTHER PUBLICATIONS

English translation of the International Search Report of the International Searching Authority for International Application PCT/DE2017/200061, dated Sep. 11, 2017, 3 pages, European Patent Office, HV Rijswijk, Netherlands.
(Continued)

*Primary Examiner* — Alexander Gee
(74) *Attorney, Agent, or Firm* — W. F. Fasse

(57) ABSTRACT

A camera device (2) for capturing a surrounding area of a driver's own vehicle has optoelectronics including a high-resolution image capturing sensor and a wide-angle optical system for capturing at least one initial image of the surrounding area. The optoelectronics are configured to generate, from the at least one initial image, a processed output image (4) that has, compared to the associated initial image, at least one non-modified image section (4a) and a resolution-reduced remainder image region (4b) bordering on the at least one non-modified image section (4a).

18 Claims, 3 Drawing Sheets

(51) Int. Cl.
  *H04N 5/347* (2011.01)
  *G03B 37/00* (2006.01)
  *B60R 1/00* (2006.01)
(58) Field of Classification Search
  CPC ........ B60R 21/01538; B60R 2300/105; B60R 2300/202; B60R 2300/301; B60R 2300/302; B60R 2300/306; B60R 2300/60; B60R 2300/802; B60R 2300/8033; B60R 2300/804; B60R 2300/8093; G06T 2207/30248; G06T 2207/30252
  See application file for complete search history.

(56) References Cited

U.S. PATENT DOCUMENTS

| | | | |
|---|---|---|---|
| 2003/0198393 A1 | 10/2003 | Berstis | |
| 2004/0141067 A1 | 7/2004 | Nakayama et al. | |
| 2006/0266835 A1 | 11/2006 | Tanida | |
| 2008/0199069 A1 | 8/2008 | Schick et al. | |
| 2008/0291304 A1 | 11/2008 | Ota et al. | |
| 2012/0038991 A1* | 2/2012 | Miyano | G02B 23/14 359/643 |
| 2014/0293057 A1* | 10/2014 | Wierich | G02B 5/10 348/148 |
| 2014/0293080 A1* | 10/2014 | Choi | H04N 5/3456 348/222.1 |
| 2014/0368823 A1* | 12/2014 | Wirthlin | G01N 21/55 356/448 |
| 2015/0274179 A1* | 10/2015 | Inoue | B60T 7/22 701/70 |
| 2016/0167583 A1 | 6/2016 | Schrepfer | |
| 2017/0132479 A1* | 5/2017 | Krokel | G06K 9/00818 |
| 2017/0244775 A1* | 8/2017 | Ha | G06T 19/006 |
| 2018/0012085 A1* | 1/2018 | Blayvas | G06K 9/00805 |
| 2020/0059613 A1 | 2/2020 | Dreier et al. | |

FOREIGN PATENT DOCUMENTS

| | | |
|---|---|---|
| DE | 102013221882 | 4/2015 |
| DE | 102014215372 | 2/2016 |
| DE | 102015208889 | 11/2016 |
| EP | 1 953 698 | 8/2008 |

OTHER PUBLICATIONS

PCT International Preliminary Report on Patentability including English Translation of PCT Written Opinion of the International Searching Authority for International Application PCT/DE2017/200061, dated Jan. 22, 2019, 6 pages, International Bureau of WIPO, Geneva, Switzerland.

German Search Report for German Patent Application No. 10 2016 213 493.0, dated Apr. 4, 2017, 8 pages, German Patent and Trademark Office, Muenchen, Germany, with partial English translation, 7 pages.

Patrice Roulet et al., "Multi-Task Single Lens for Automotive Vision Applications", Proceedings of SPIE, vol. 7314, May 1, 2009, XP055166773, ISSN: 0277-766X, 14 pages.

* cited by examiner

CAMERA DEVICE FOR CAPTURING A SURROUNDING AREA OF A DRIVER'S OWN VEHICLE AND METHOD FOR PROVIDING A DRIVER ASSISTANCE FUNCTION

FIELD OF THE INVENTION

The invention relates to a camera device for capturing a surrounding area of a driver's own vehicle. The invention further relates to the vehicle with such a camera device and a method for providing a driver assistance function.

BACKGROUND INFORMATION

In order to produce driver assistance devices such as e.g. traffic sign recognition or a lane departure warning system, camera systems require a horizontal viewing angle of approx. degrees and a vertical viewing angle of approx. 30 degrees. However, new functions such as cross traffic or traffic light recognition notably require a much larger viewing angle in order to be able to detect objects located in the peripheral area of the image during tailgating. In contrast, highly automated driving or a lane departure warning system, for example, also requires recognition of objects and roadway structures at a great distance, necessitating a corresponding resolution.

In connection with this, camera systems with at least two optoelectronic systems are known, for example, which differ at least in the viewing angle and/or in the angle resolution, in order to consequently meet the opposing requirements of detecting the central area with a long range and detecting a wide-angle area for recognizing cross traffic. Thus, the printed publication DE102004061998A1, for example, describes a device for a motor vehicle with at least one first camera and at least one second camera, the first and the second camera differing in at least one camera property.

The disadvantages of such camera systems are, for example, the data quantities to be processed as well as the considerable costs due to the plurality of optoelectronics which are the most expensive components of a camera system.

SUMMARY OF THE INVENTION

The object of the invention is to create a camera device which realizes an efficient image processing and, at the same time, fulfils the requirements with respect to detailed capturing and as large a detection range as possible in order to produce driver assistance devices.

This object can be achieved by a camera device, a vehicle, and a method respectively having the features of the invention as set forth herein. Advantageous or preferred embodiments of the invention are also explained in the following description and by the figures.

A camera device for capturing a surrounding area of a driver's own vehicle is proposed. The surrounding area is, for example, a surrounding area lying ahead in the direction of travel of the driver's own vehicle, a lateral surrounding area and/or a rear surrounding area.

The camera device has optoelectronics for capturing at least one initial image of the surrounding area. The at least one initial image captured by the optoelectronics is preferably an original image.

The optoelectronics comprise a wide-angle optical system. In particular, an initial image captured with a wide angle is realized by means of the wide-angle optical system. The term 'wide-angle optical system' preferably denotes an objective comprising a horizontal and/or vertical viewing angle of e.g. at least +/−50 degrees, in particular of at least +/−70 degrees and/or of at most +/−80 degrees to the optical axis. Consequently, a peripheral environment such as e.g. a crossroads area is, for example, made possible for early object evaluation of crossing road users.

Furthermore, the optoelectronics comprise a high-resolution image capturing sensor. Object evaluation such as e.g. the evaluation of far-range road signs or lanes, consequently in particular in a distance range from the driver's own vehicle of at least 50 meters, is in particular made possible by means of the high-resolution image capturing sensor. The term 'high-resolution image capturing sensor' denotes, in particular, an image capturing sensor comprising a number of pixels of several megapixels, for example of at least five megapixels, preferably of at least seven megapixels, specifically of at least ten megapixels. The image capturing sensor preferably has a homogeneous pixel/cm resolution.

High-resolution image capturing sensors are classed as unsuitable for automotive use, in particular in connection with a wide-angle optical system, since they do not permit efficient processing of the large number of pixels for the elaborate image processing algorithms.

Against this background, the optoelectronics, in particular the image capturing sensor or an image processing apparatus of the camera device, is/are designed to generate, from the at least one captured initial image, a processed output image, the processed output image comprising, compared to the associated initial image, at least one non-modified image section and a resolution-reduced residual image region defined on the at least one image section. The term 'non-modified image section' consequently denotes, in particular, a partial image region of the initial image having a non-modified, in other words unchanged, resolution. As a consequence, a resolution reduction is excluded in particular in the image section, so that exclusively a partial resolution reduction of the captured initial image is effected.

In the event of a captured sequence of images, the optoelectronics are preferably designed to generate, from each of the captured initial images, a processed output image in each case.

One significant advantage of the partial resolution reduction is the, on average, approximately similar or slightly higher computational cost for evaluating the entire output image, compared to vehicle cameras which, up to now, have had significantly lower resolution rates of e.g. a maximum of two megapixels in order to realize a feasible image processing outlay but which, as a result, do not allow far-range evaluation.

Furthermore, it is in particular ensured that, due to an otherwise too high computational cost, it is not merely the partial image regions of the initial image which are evaluated, which could possibly result in at least a belated evaluation of relevant target objects. Consequently, despite the high-resolution image capturing sensor and the wide-angle optical system, a computational cost can be achieved which makes it possible to evaluate target objects in the entire output image.

Accordingly, the conflicting goals of attaining as large a detection range as possible and, simultaneously, a sufficient resolution for evaluating far-range target objects with a feasible image processing outlay, in order to produce driver assistance devices, are fulfilled with only one camera device.

Furthermore, what is remarkable is, on the one hand, the compact dimensions and, on the other hand, the considerable cost saving of the camera device compared with camera devices having two or even three optoelectronic systems.

The camera device preferably comprises at least one driver assistance device such as e.g. a lane departure warning system or turning assistance device or can be connected thereto. The driver assistance device is, in particular, designed to evaluate at least one target object from the processed output image of the at least one initial image such as e.g. lanes, traffic lights, road signs, pedestrians, cyclists and/or further road users and, as a function of the at least one evaluated target object, to carry out at least one passive and/or active driver assistance function such as e.g. a distance warning, emergency braking or an autonomous evasive maneuver.

The optoelectronics are preferably designed to generate the residual image region in a resolution-reduced manner by means of pixel binning. During pixel binning, neighboring pixels of the image capturing sensor, e.g. within a line and/or a column or in an e.g. rectangular partial area of the initial image, are in particular combined and assigned to a new pixel. Consequently, the resulting pixel matrix of the resolution-reduced, generated output image comprises, in particular, a lower resolution than the captured initial image.

Alternatively or optionally additionally, the optoelectronics are designed to generate the residual image region in a resolution-reduced manner by means of pixel skipping. In particular, pixels in the initial image are skipped in a specified sequence during pixel skipping, so that only a partial amount of the pixels is preferably adopted for the output image. In this way, a lower resolution of the output image is, in particular, realized and, as a consequence, a reduction in the data quantity is achieved.

In a first preferred embodiment, the image capturing sensor is designed to generate, from the at least one captured initial image, the processed output image. Consequently, the generation of the processed output image and, as a consequence, the resolution reduction of the residual image region of the at least one initial image, are in particular effected by means of electronic pixel binning and/or pixel skipping on the image capturing sensor. A partial amount of the total number of pixels is preferably exclusively output by the image capturing sensor, wherein the remainder of the number of pixels is masked or merged. In particular, the total amount of the number of pixels corresponds to the initial image, and the output partial amount corresponds to the generated processed output image. In other words, the output image is consequently processed and output, in particular, by the image capturing sensor.

In a second preferred embodiment, the camera device comprises the image processing apparatus which is designed to generate, from the at least one initial image transmitted by the image capturing sensor, the processed output image. Consequently, processing and, as a consequence, resolution reduction of the initial image take place downstream of the image capturing, e.g. by means of subsequent pixel binning and/or pixel skipping.

The at least one image section is preferably a central image portion located around the optical axis or a peripheral image portion of the initial image joining the central image portion. The central image portion is preferably a middle image region of the field of vision of the camera device, which is arranged symmetrically, specifically rotationally symmetrically, to the optical axis. The peripheral image portion is, in particular, at least one of the four marginal image portions of the field of vision of the camera device. Consequently, the peripheral image portion preferably surrounds the central image portion at least partially. The central and the peripheral image portion are particularly preferably arranged concentrically to the optical axis of the camera device. The central and the peripheral image portion are preferably different, specifically overlapping-free detection ranges of the field of vision of the camera device. The field of vision of the camera device is particularly preferably formed by the central and the peripheral image portion.

The central image portion has e.g. a horizontal viewing angle, alternatively or optionally additionally, a vertical viewing angle of +/−25 degrees. The peripheral image portion joining the central image portion has e.g. a horizontal viewing angle, alternatively or optionally additionally, a vertical viewing angle of at least +/−50 degrees.

The more extensively the far-range object evaluation is made possible, the more reliably and more proactively the driver assistance functions of the driver assistance devices can be executed. Against this backdrop, a particularly preferred configuration makes provision for the captured initial image in the central image portion to have at least partially a higher resolution, in particular at least double the resolution, than in the peripheral image portion. The resolution particularly preferably decreases as the horizontal and/or vertical viewing angles increase in terms of magnitude, at least in sections. In this way, both close-range target objects, for example in the distance range between one and 50 meters, and far-range target objects, for example in the distance range between 50 and 500 meters, in the central image portion can be evaluated by individual optoelectronics. Since target objects located in the peripheral image portion, especially close-range target objects such as e.g. crossing cyclists, are to be evaluated in the crossroads area, a lower resolution due to the non-uniform wide-angle optical system is possible for the object evaluation.

In order to realize the at least partially higher resolution in the central image portion, it is preferred of the design configuration that the wide-angle optical system comprises a non-uniform, in particular a non-linear, distortion and is specifically designed as an anamorphic wide-angle optical system. In particular, a resolution of up to 50 pixels per degrees can be achieved by means of the non-uniform distortion as a function of the resolution of the image capturing sensor. In this way, the resolution which is required in particular for far-range object evaluation is made possible without an additional teleoptical system.

In a preferred further development, the wide-angle optical system has at least one or precisely one lens which is designed to be panamorph, specifically anamorphic, at least in sections, for example the spherical surface portion. Panamorph, specifically anamorphic, lenses produce, at least in sections, a distortion of the initial image and in particular make possible, due to their elliptical form, a larger coverage in terms of surface area compared with other lens forms, so that more pixels can be produced per imaged zone. In this way, an improved recognition of target objects is achieved in the central image portion despite the distortion.

Relevant target objects in the peripheral image portion are, in particular, to be evaluated at low vehicle speeds in the urban environment, whereas they are to be evaluated at high vehicle speeds on roads out of town, in particular in the far range of the central image portion. Against this background, the optoelectronics, in particular the image processing apparatus, is/are e.g. designed to specify the image section as a central image portion or peripheral image portion as a function of a current established vehicle speed and/or a current established steer angle of the driver's own vehicle. The vehicle speed and/or the steer angle allow conclusions to be drawn regarding on which category of road the driver's own vehicle is currently located such as on a road in town or on the motorway. In this way, the required resolution can be maintained during the evaluation of current, relevant target objects in the peripheral image portion, even in the case of non-uniform optics.

Alternatively or optionally additionally, the optoelectronics, in particular the image processing apparatus, is/are designed to specify the image section as a central image portion or peripheral image portion as a function of an established transport area lying ahead and/or of the category of road on which the driver's own vehicle is currently located. By establishing the transport area lying ahead, relevant traffic areas with characteristic target objects such as a crossroads area with crossing road users can be detected. With respect to the category of road, a distinction is made, for example, between a motorway, federal highway and/or a road in town. By establishing the transport area lying ahead and/or the category of road, it is possible to adjust the image section as a function of the current vehicle surroundings and, consequently, to individually adjust it e.g. for the target objects to be evaluated by the at least one driver assistance device.

For example, the driver's own vehicle comprises a locating means such as a GPS sensor that is designed to determine the current position, consequently the current location, of the driver's own vehicle, in which the camera device can be or is integrated. Furthermore, the driver's own vehicle comprises, for example, a navigation data server inside the vehicle for calling up electronic maps. An evaluation unit of the driver's own vehicle is preferably designed to evaluate, by means of the determined position of the driver's own vehicle as well as by means of information data of the electronic maps, the transport area lying ahead and/or the category of road, starting from the current position of the driver's own vehicle, and to transmit the evaluated transport area or respectively the category of road to the image processing apparatus.

A further subject matter of the invention relates to a vehicle with a camera device according to the preceding description.

The invention further relates to a method for providing a driver assistance function of at least one driver assistance device of a driver's own vehicle. In a first step, at least one initial image of the surrounding area is captured with a camera device according to the preceding description. In a next step, a processed output image is generated by the optoelectronics, in particular by the image capturing sensor and/or the image processing apparatus of the camera device from the at least one initial image. The processed output image has, compared to the associated initial image, at least one non-modified image section and a resolution-reduced residual image region defined on the at least one image section. From the at least one processed output image, at least one target object is evaluated. The evaluation of the at least one target object is effected, in particular, by the at least one driver assistance device of the camera device. A driver assistance function such as e.g. braking, warning and/or steering assistance is preferably executed on the basis of the at least one evaluated target object.

BRIEF DESCRIPTION OF THE DRAWINGS

Further features, advantages and effects of the invention are set out by the following description of preferred embodiment examples of the invention, wherein.

DETAILED DESCRIPTION OF EXAMPLE EMBODIMENTS OF THE INVENTION

Figure 1:
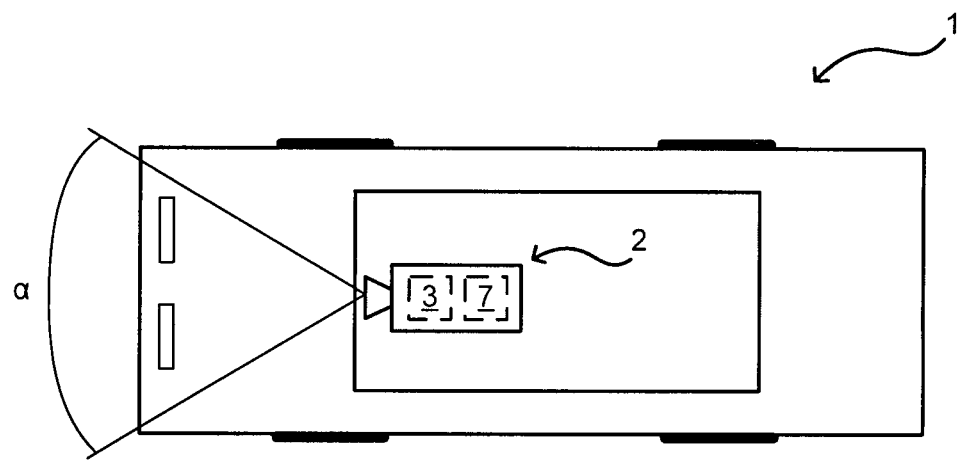
FIG. 1 shows a schematic top view of a vehicle comprising a camera device.

Parts corresponding to one another are provided with the same reference numeral in all of the figures.

FIG. 1 shows a schematic representation of a vehicle 1 with a camera device 2 for capturing a surrounding area lying ahead. In this embodiment example, the camera device 2 is a camera arranged in the interior of the driver's own vehicle 1 behind the windshield and aimed in the direction of travel of the driver's own vehicle 1. In particular, the camera device 2 is designed as a mono camera device 2 with precisely one optoelectronic system 3.

The optoelectronics 3 of the camera device 2 are designed to capture at least one initial image of the surrounding area lying ahead. In order to capture the initial image, the optoelectronics comprises a wide-angle optical system and a high-resolution image capturing sensor.

The wide-angle optical system has e.g. a horizontal and/or vertical viewing angle $\alpha$, $\beta$ of +/−50 degrees to the optical axis A. An early evaluation of target objects such as e.g. crossing road users is made possible by means of the wide-angle optical system.

The image capturing sensor has e.g. a resolution of at least five, in particular at least seven, specifically at least ten megapixels. This resolution also produces the evaluation of far-range target objects.

Figure 4:
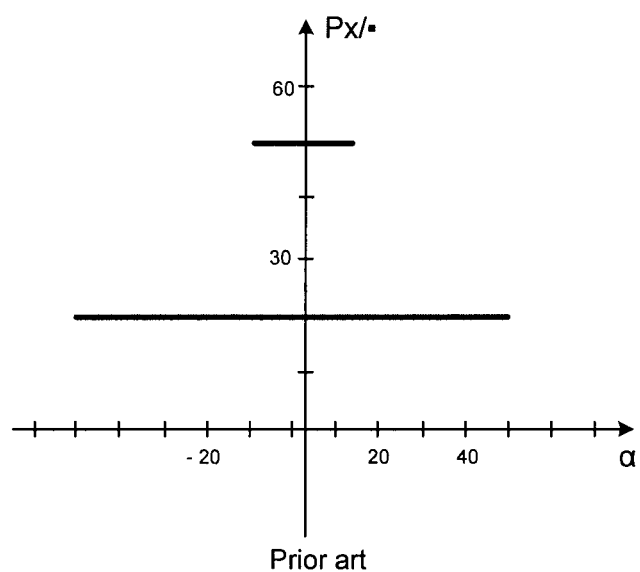
FIG. 4 shows a diagram of a resolution curve as a function of a horizontal viewing angle of two optoelectronics respectively of a camera system known as the prior art.

In this way, it is possible to dispense with e.g. cost-intensive multiple optoelectronics which are, in particular, provided to evaluate either the marginal image portion or the central image portion (FIG. 4).

Consequently, the camera device 2 is, on the one hand, designed with a wide-angle detection range which can be notably required for the early recognition of crossing road users in the crossroads area or for traffic light recognition, for example. On the other hand, the at least one initial image is realized at high resolution, so that both close-range target objects, for example in the distance range between one and 50 meters, and far-range objects, for example in the distance range between 50 and 500 meters, can be evaluated. As a consequence, the conflicting goals of the wide-angle and tele range are achieved using a single optoelectronics 3.

However, such an initial image exceeds a data quantity which can be processed by an image evaluation apparatus, specifically a processor used in particular in the automotive sector for evaluating the target objects.

The optoelectronics 3, in particular the image capturing sensor or an image processing apparatus of the optoelectronics 3, is/are designed to generate, from the at least one captured initial image, a processed output image 4. The field of vision of the output image 4 is preferably non-modified with respect to the field of vision of the initial image.

The processed output image 4 has, compared to the associated initial image, at least one non-modified image section 4a and a resolution-reduced residual image region 4b defined on the at least one image section. As a result, a recoverable data quantity is in particular available for the image evaluation apparatus installed in the driver's own vehicle 1, specifically in the camera device 2. Furthermore, object evaluation in the central as well as in the peripheral environment of the driver's own vehicle 1 is achieved in various distance ranges with only one camera device 2.

Moreover, the camera device 2 comprises e.g. at least one driver assistance device 7 with the image evaluation apparatus which is, in particular, designed to evaluate target objects from the output image 4 processed by the optoelectronics 3 and to execute at least one driver assistance function on the basis of the evaluated target objects.

A hierarchy, also known as a pyramid structure, of images of differing resolution is preferably calculated from the processed output image 4. For example, at least three images with a resolution are provided, which resolution is in each case lowered by a half. In particular, the lowest-resolution image is scanned first by the image evaluation apparatus to recognize objects, in order to keep the computational cost as low as possible. If a target object is recognized by the image evaluation apparatus in the lowest-resolution image, recourse is preferably had to the next-highest resolution representation, in order to validate the object recognition in particular.

For example, the resolution of the captured initial image is reduced by means of pixel binning. The term 'pixel binning' denotes, in particular, combining multiple, for example four, physical pixels into one pixel. In the event of the four pixels being combined into one pixel, only ¼ of the physical number of pixels is to be processed as pixels.

For example, the at least one image section 4a is placed by the optoelectronics 3, in particular by the image sensor capturing apparatus or image processing apparatus, into that partial image region of the initial image in which the object evaluation is prioritized or an evaluation is to be effected in a distance range of at least 50 meters.

Figure 2:
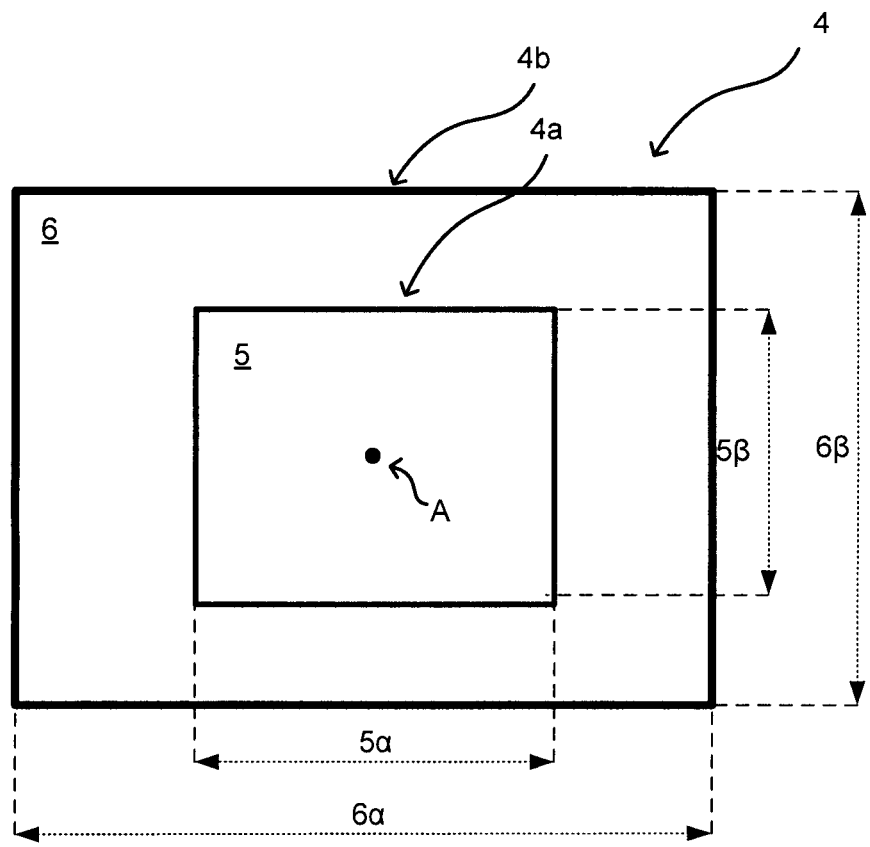
FIGS. 2 and 3 respectively show one embodiment example of a processed output image with a non-modified image section and a resolution-reduced residual image region defined on the image section.
Figure 3:
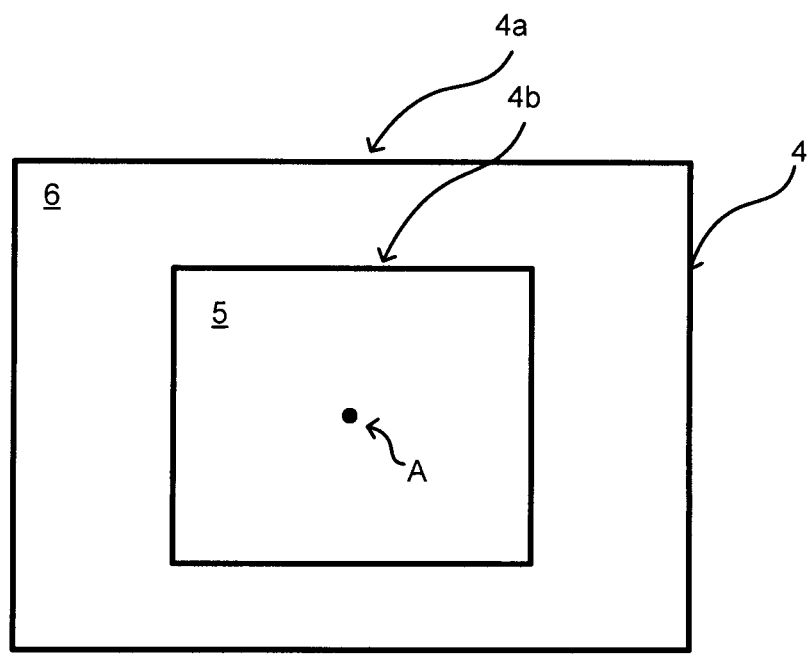

FIGS. 2 and 3 represent embodiment examples of a processed output image 4 with a non-modified image section 4a and a resolution-reduced residual image region 4b bordering on the image section 4a.

In the embodiment example shown in FIG. 2, the image section 4a is a central image portion 5 located around the optical axis A and the residual image region 4b is a peripheral image portion 6 of the initial image joining the central image portion 5. The central image portion 5 comprises e.g. a horizontal and/or vertical viewing angle $5\alpha$, $5\beta$ of +/−25 degrees. Due to this viewing angle range, the course of detected lane(s) which are to be evaluated can be extended, for example. The horizontal peripheral image portion 6 comprises, in particular, a horizontal and/or vertical viewing angle $6\alpha$, $6\beta$ of +/−50 degrees, so that e.g. crossroads areas can also be widely captured. Purely by way of example, the peripheral image portion 6 comprises each of the four marginal image portions of the captured initial image.

In the embodiment example shown in FIG. 3, the image section 4a is the peripheral image portion 6 located around the optical axis A, and the residual image region 4b is the central image portion 5. This configuration is in particular advantageous, if e.g. crossing road users and/or the traffic lights in a crossroads area are to be evaluated.

For example, the image section 4a is specified as the central image portion 5 and/or peripheral image portion 6 as a function of the vehicle speed, the steer angle, the transport area lying ahead and/or the category of road on which the driver's own vehicle 1 is currently located.

Due to the fact that, as the vehicle speed increases, increasing resolution is likewise required in the central image portion 5, e.g. for the early evaluation of the road signs and/or of the course of the lane, the image section 4b is preferably placed on the central image portion 5 when exceeding a speed threshold value of e.g. 100 km/h. Due to the fact that, at lower speeds, at least a sufficient resolution is to be ensured in the peripheral image portion 6 for early cross traffic and/or traffic light recognition, the image section 4a is specified as the peripheral image portion 6, for example when falling below a speed threshold value of e.g. 30 km/h, and especially when the vehicle is stationary.

In FIG. 4, a resolution curve is plotted over the horizontal viewing angle $\alpha$ of a camera system comprising two optoelectronic systems, by way of example, as the known prior art. One of the optoelectronic systems comprises a linear wide-angle optical system, the other of the optoelectronic systems comprises a linear teleoptical system, in order to realize both the far range in the central image portion and an extended field of vision range for the teleoptical system.

Figure 5:
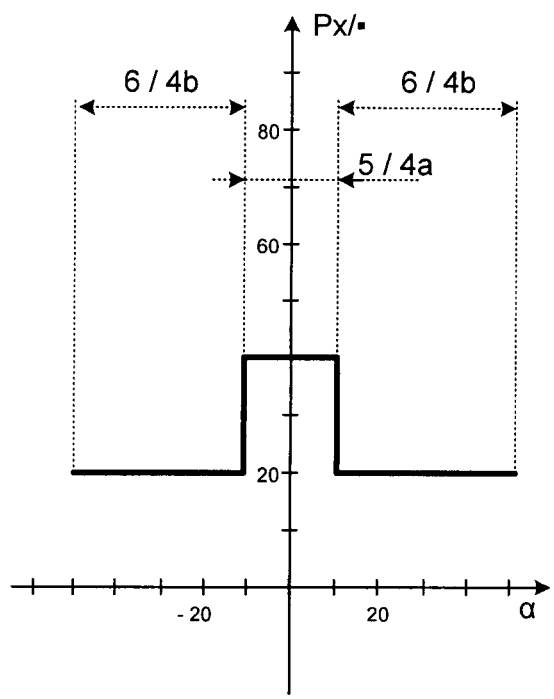
FIG. 5 shows a diagram of the resolution curve of the output image corresponding to the embodiment example from FIG. 2.
Figure 6:
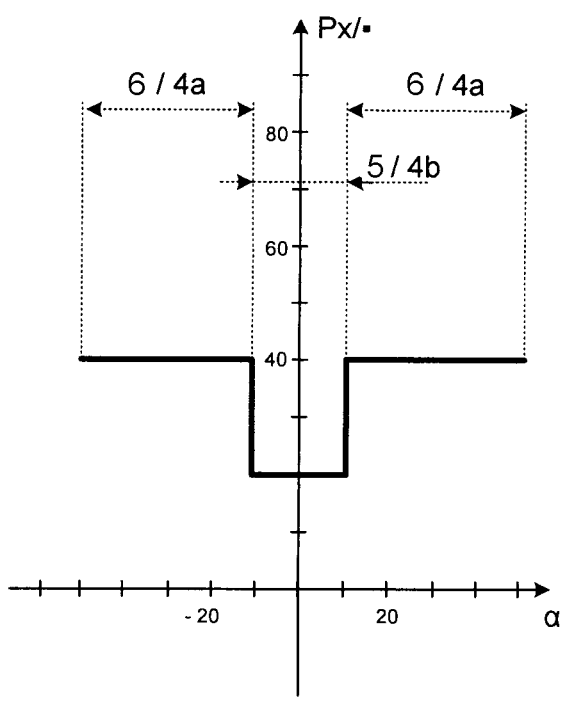
FIG. 6 shows a diagram of the resolution curve of the output image corresponding to the embodiment example from FIG. 3.

In comparison, in FIGS. 5 and 6 the resolution curve is plotted, by way of example, over the horizontal viewing angle $\alpha$ of the output image 4 generated by the camera device 2 according to the invention. In this embodiment example, the optoelectronics comprise a high-resolution image capturing sensor comprising 7.23 megapixels in 16:9 format and a linear wide-angle optical system with a horizontal viewing angle $\alpha$ of +/−50 degrees.

In FIG. 5, the central image portion 5 corresponds to the image section 4a, whereas the peripheral image portion 6 is specified as the resolution-reduced residual image region 4b. As represented in FIG. 6, the peripheral image portion 6 can alternatively be specified as the image section 4a, while the central image portion 5 is specified as the resolution-reduced residual image region 4b. It is, in particular, essential that, on average, an at least approximately consistently high total number of pixels to be processed is realized.

Figure 7:
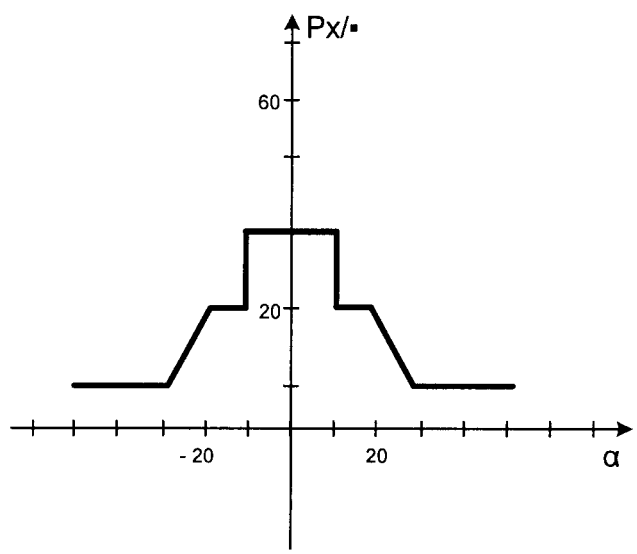
FIG. 7 shows a diagram of the resolution curve of the output image corresponding to the embodiment example from FIG. 5, wherein the associated initial image has been captured with a camera device having an anamorphic optical system.

In FIG. 7, the resolution curve is plotted, by way of example, over the horizontal viewing angle $\alpha$ of the output image 4 generated by the camera device 2 according to the invention. In this embodiment example, the optoelectronics comprise a high-resolution image capturing sensor comprising 7.23 megapixels in 16:9 format and an anamorphic wide-angle optical system with a horizontal viewing angle $\alpha$ of +/−50 degrees. By means of the anamorphic wide-angle optical system, the resolution in the central image portion 5 is increased compared to a linear wide-angle optical system, at least in sections, but, at the same time, is reduced in the peripheral image portion 6. A partial resolution reduction in the peripheral image portion could therefore possibly lead to falling short of the resolution required for a reliable object evaluation. Here, specifying the image section 4a as a function of or dependent on the current driving situation such as the current vehicle speed or the traffic space ahead of the subject vehicle proves to be advantageous, because in the case of the requirement for a sufficient resolution in the peripheral image portion 6, the image section 4a is, in particular, placed on this peripheral image portion 6 and, consequently, reliable object evaluation is ensured.

LIST OF REFERENCE NUMERALS

1 Vehicle
2 Camera device

3 Optoelectronics
4 Processed output image
4a Image section
4b Residual image region
5 Central image portion
6 Peripheral image portion
7 Driver assistance device
α Horizontal viewing angle
β Vertical viewing angle
A Optical axis

The invention claimed is:

1. A camera device for capturing a surrounding area of a subject vehicle,
comprising optoelectronics including a high-resolution image capturing sensor and a wide-angle optical system configured to capture at least one initial image of the surrounding area,
wherein:
the image capturing sensor has a homogeneous resolution,
each said initial image includes a central image portion located around an optical axis of the optical system, and a peripheral image portion adjoining the central image portion,
in each said initial image, the peripheral image portion has a first resolution, and at least a part of the central image portion has a second resolution that is at least double the first resolution,
the optoelectronics are configured to generate, from an associated one of the at least one initial image, a processed output image, and
the processed output image has, compared to the associated initial image, at least one non-modified image section, and a resolution-reduced remainder image region bordering on the at least one non-modified image section.

2. The camera device according to claim 1, wherein the optoelectronics are configured to generate the remainder image region in a resolution-reduced manner by pixel binning and/or pixel skipping.

3. The camera device according to claim 1, wherein the resolution of the image capturing sensor is at least five megapixels.

4. The camera device according to claim 1, wherein the wide-angle optical system has a horizontal viewing angle and/or a vertical viewing angle of +/−50 degrees about the optical axis of the optical system.

5. The camera device according to claim 1, wherein the image capturing sensor of the optoelectronics is configured to generate, from the associated one of the at least one initial image, the processed output image.

6. The camera device according to claim 1, wherein the optoelectronics further comprise an image processing apparatus that is configured to generate the processed output image, from the associated one of the at least one initial image, which is captured and transmitted by the image capturing sensor.

7. The camera device according to claim 1, wherein the at least one non-modified image section of the processed output image corresponds to the central image portion of the associated initial image.

8. The camera device according to claim 1, wherein the central image portion has a horizontal viewing angle of at most +/−25 degrees.

9. The camera device according to claim 1, wherein the wide-angle optical system has a non-uniform distortion which is configured to realize the first resolution in the peripheral image portion and the second resolution in the central image portion.

10. The camera device according to claim 1, wherein the wide-angle optical system has at least one lens which is panamorphic specifically anamorphic at least in a section thereof.

11. The camera device according to claim 1, wherein the optoelectronics are configured to generate the at least one non-modified image section of the processed output image as corresponding to the central image portion or the peripheral image portion of the associated initial image dependent on a traffic area lying ahead of the subject vehicle and/or dependent on a category of a road on which the subject vehicle is currently located.

12. The camera device according to claim 1, wherein the optoelectronics are configured to generate the at least one non-modified image section of the processed output image as corresponding to the central image portion or the peripheral image portion of the associated initial image dependent on a current established vehicle speed of the subject vehicle and/or dependent on a current steering angle of the subject vehicle.

13. The camera device according to claim 1, further comprising at least one driver assistance device configured to evaluate at least one target object from the processed output image, and to carry out at least one driver assistance function dependent on the at least one evaluated target object.

14. A combination comprising a vehicle and the camera device according to claim 1.

15. A method of using the camera device according to claim 1, to provide a driver assistance function of at least one driver assistance device of the subject vehicle, comprising the steps:
with the optoelectronics, capturing the at least one initial image of the surrounding area of the subject vehicle;
with the optoelectronics, generating the processed output image from the associated one of the at least one initial image; and
evaluating at least one target object from the at least one processed output image.

16. The camera device according to claim 1, wherein the at least one non-modified image section of the processed output image corresponds to the peripheral image portion of the associated initial image.

17. The camera device according to claim 8, wherein the peripheral image portion has a horizontal viewing angle of at least +/−50 degrees.

18. The camera device according to claim 1, wherein the peripheral image portion has a horizontal viewing angle of at least +/−50 degrees.

\* \* \* \* \*